US007153044B1

United States Patent
Kossat et al.

(10) Patent No.: US 7,153,044 B1
(45) Date of Patent: Dec. 26, 2006

(54) OPTICAL WAVEGUIDE SPLICER FOR LINKING OPTICAL FIBERS IN A MATERIAL FIT

(75) Inventors: Rainer Kossat, Aschau (DE); Frank Zimmer, Scheuring (DE)

(73) Assignee: Corning Cable Systems LLC, Hickory, NC (US)

( * ) Notice: Subject to any disclaimer, the term of this patent is extended or adjusted under 35 U.S.C. 154(b) by 198 days.

(21) Appl. No.: 10/381,574

(22) PCT Filed: Sep. 25, 2000

(86) PCT No.: PCT/DE00/03330

§ 371 (c)(1),
(2), (4) Date: Jul. 11, 2003

(87) PCT Pub. No.: WO02/27368

PCT Pub. Date: Apr. 4, 2002

(51) Int. Cl.
*G02B 6/255* (2006.01)

(52) U.S. Cl. .......................................... 385/96; 65/501
(58) Field of Classification Search ............ 385/95–99; 65/501
See application file for complete search history.

(56) References Cited

U.S. PATENT DOCUMENTS

| 4,906,810 A | 3/1990 | Sharma et al. ......... 219/121.46 |
| 5,222,171 A | 6/1993 | Straus .......................... 385/96 |
| 5,717,813 A | 2/1998 | Harman et al. ............. 385/147 |
| 5,740,301 A | 4/1998 | Harman et al. ............ 385/14.7 |
| 6,336,750 B1 * | 1/2002 | Clark et al. ................... 385/96 |
| 6,610,965 B1 * | 8/2003 | Tanabe ........................ 219/383 |

FOREIGN PATENT DOCUMENTS

| AU | 681921 | 9/1997 |
| CH | 643217 | 5/1984 |
| DE | 4235924 C2 | 8/1994 |
| JP | 02205807 A * | 8/1990 |

OTHER PUBLICATIONS

Patent Abstract of Japan; 61-045203; Mar. 5, 1986.
Patent Abstract of Japan; 58-154813, Sep. 14, 1983.
Patent Abstract of Japan; 52-020843, Feb. 17, 1977.
Telekom Report 19 (1956), Issue 1; pp. 39-42.
Telekom Report 18 (1995), Issue 3; pp. 136-139.
Telekom Report 13 (1990), Issue 2; pp. 62-65.
Telekom Report 9 (1986), Issue 3; pp. 197-201.
ICCS and Future-Link; catalogue 1998; Siemens-Communications-Cable Networks; pp. 107-116.

* cited by examiner

*Primary Examiner*—Sung Pak
*Assistant Examiner*—Daniel Petkovsek
(74) *Attorney, Agent, or Firm*—Jeffrey S. Bernard

(57) ABSTRACT

The invention concerns an optical fiber splicing device (LWL-SPG) for substance-determined connection of optical fibers (F1, F2) by means of an electric corona discharge (GEG). A corona discharge guide (LBF11/12, LBF2, LBF3) is arranged over the electrodes (E1, E2) for the stabilization of the conditions during the splicing process.

13 Claims, 5 Drawing Sheets

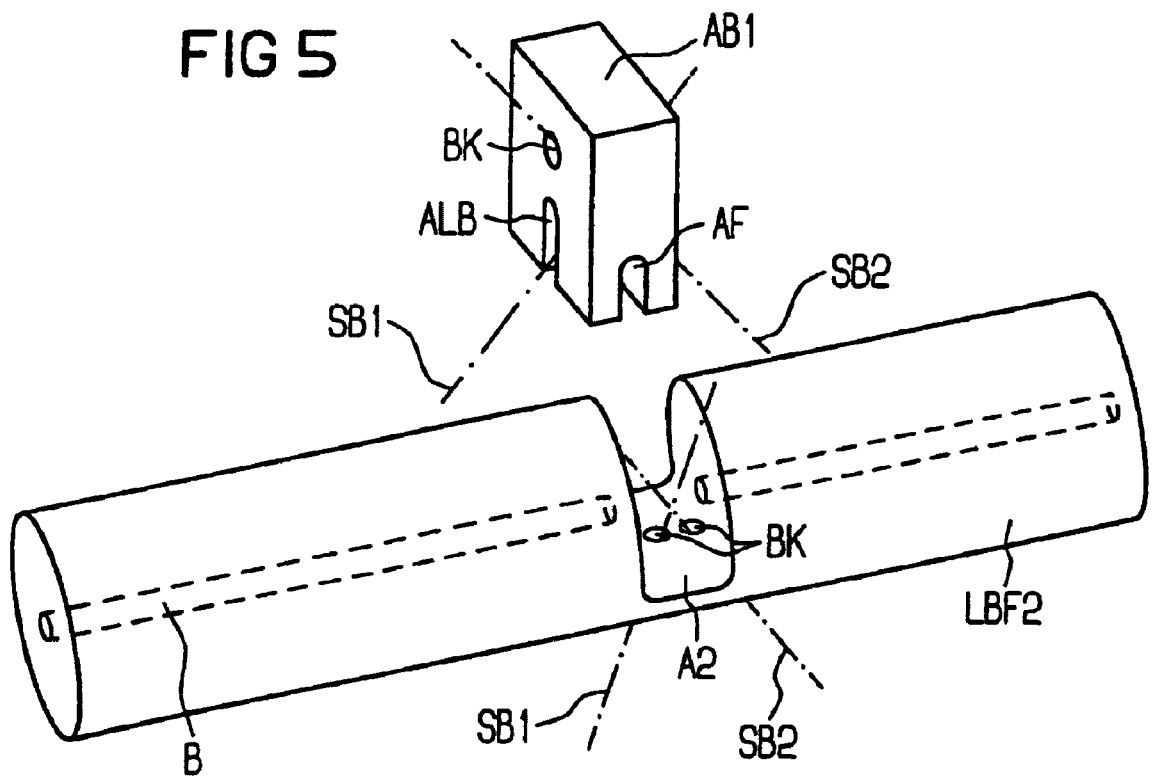
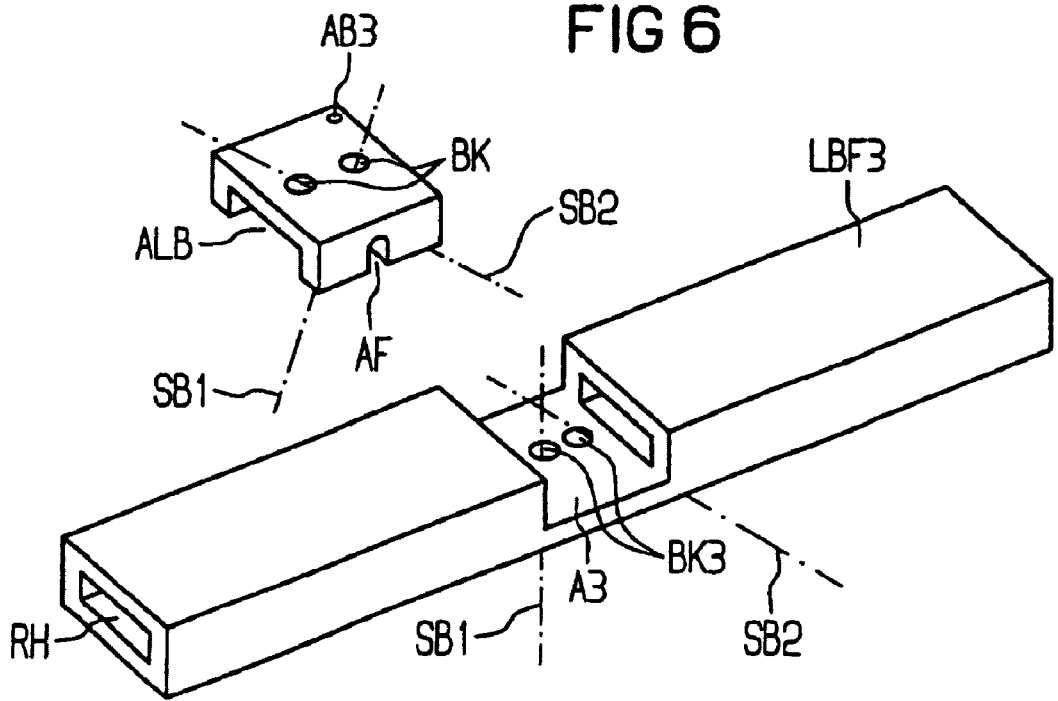

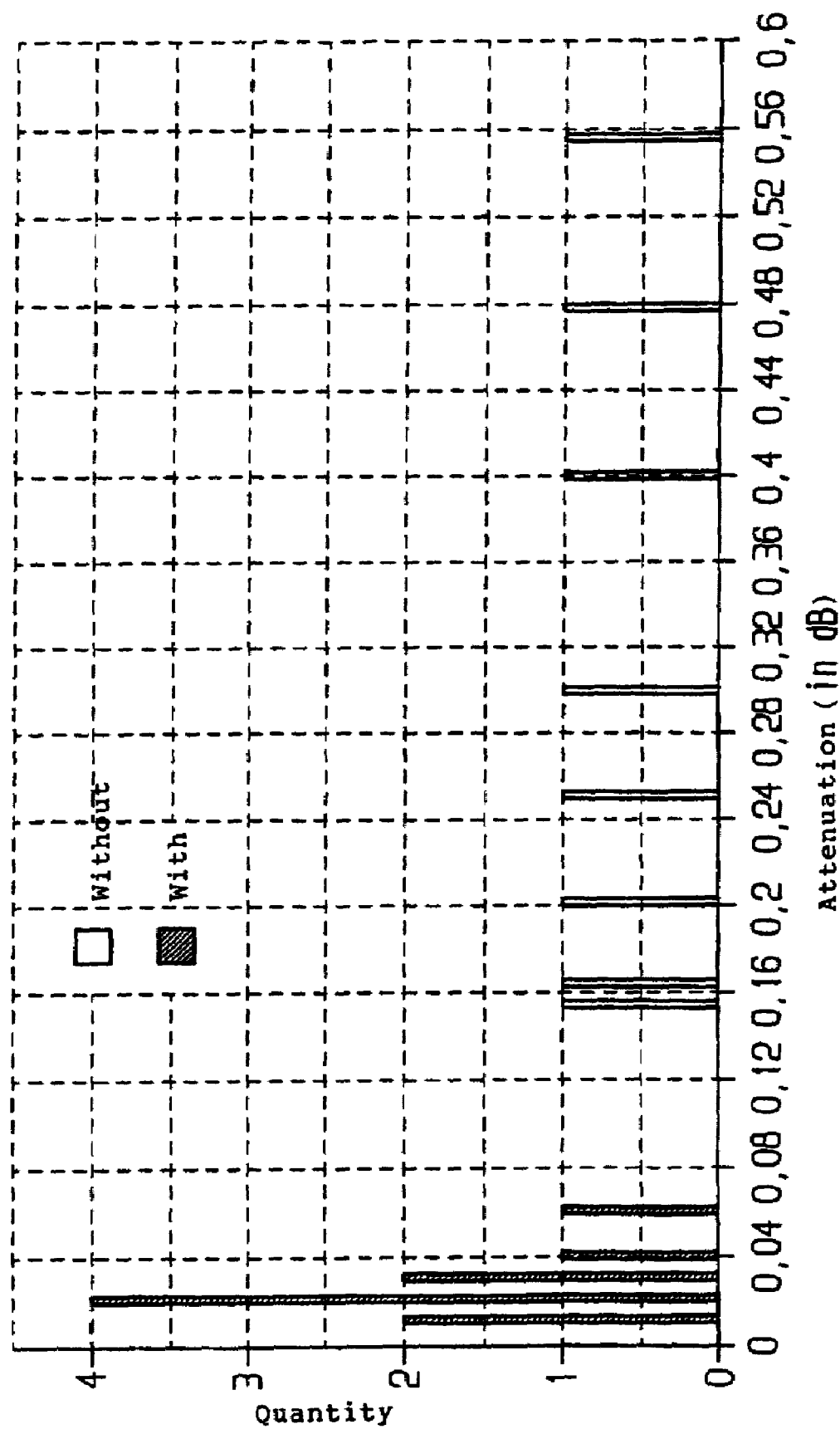

OPTICAL WAVEGUIDE SPLICER FOR LINKING OPTICAL FIBERS IN A MATERIAL FIT

CROSS REFERENCE TO RELATED APPLICATIONS

This is a 371 of PCT/DE00/0330, filed Sep. 25, 2000.

FIELD OF THE INVENTION

The invention concerns an optical fiber splicing device for substance-determined connection of optical fibers with a device for the approaching of the ends of two fibers, a positioning device for equal axis alignment of the ends of the optical fibers as well as electrodes for producing an electrical corona discharge for the splicing of the ends of the optical fibers.

BACKGROUND OF THE INVENTION

A multitude of optical fiber splicing devices are available, by which the ends of optical fibers are connected to each other by "thermal splicing". The processes used for this are suitable for singlemode as well as multimode optical fibers as well as for fiber ribbons. The substance-determined connection of the ends of the fibers takes place by heating and fusion by means of corona discharge, which occurs between two electrodes. In the formation of an optical fiber network a significant number of connections have to be made, so that adequate optical fiber splicing devices were developed. By means of these devices the processing steps necessary for connections such as the approaching of the ends of the optical fibers to be connected, their positioning and alignment and finally the actual splicing were coordinated and brought together into specially designed optical fiber splicing devices. Additionally, suitable lighting and monitoring instruments are used in these devices, through which the progress of the process can be monitored.

Such optical fiber splicing devices can be found in the following literature:
Telekom report 19 (1956), issue 1; pages 39–42
Telekom report 18 (1995), issue 3; pages 136–139
Telekom report 13 (1990), issue 2; pages 62–65
Telekom report 9 (1986), issue 3; pages 197–201
ICCS and Future-Link; catalogue 1998; Siemens-Communications-Cable Networks; pages 107–116
DE4235924-C2

The attenuation of a splice connection performed with such an optical fiber splicing device depends on the exact alignment of the light-guiding fiber cores, the quality of the fiber end faces and on the relevant splicing parameters selected. Thus in thermal connection technology, optical waveguides or optical fibers, respectively, (referred to as "fiber" in the following) are spliced together by heating two exactly aligned fiber ends to melting temperature. In this viscous state, the two ends of the fibers are pushed into each other, so that it leads to the mutual fusion of the ends of the fibers and they are thereby thermally connected. The fiber heating is performed by a corona discharge, which builds up after igniting between two electrodes.

The desired objective of the thermal connection technology is the formation of splice connection with the least possible attenuation values. With a modern splicing device under favorable conditions, median attenuation values under 0.02 dB are possible. In order to realize these low attenuations, precisely set parameters, so-called splice parameters, are necessary in addition to exactly prepared fiber ends. Important splice parameters include splicing voltage, splicing time, and the thrust with which the fiber ends are pushed towards each other. The perfectly set splicing voltage causes an optimal viscosity of the fiber ends during heating by the electrical corona discharge, so that in concert with the set splicing time and the set thrust, splice connections with small attenuation result. Optimal splicing results can only be obtained with optimal outside conditions (no air movement, normal humidity and room temperature, steady atmospheric pressure and other parameters) and with the perfect condition of the splicing device. It is also especially important that there are no contaminations of the electrodes and the fiber guides.

During prolonged use of the optical fiber splicing device, a certain contamination due to material diffusion during the splicing process and burning off of the electrodes occurs. Thus, a higher impedance results at the contamination point, so that the corona discharge avoids this point, that is, the corona discharge does not build up equally around the electrode tip. During the next splicing process, an evaporation of the old contamination occurs in addition to new material diffusion, which then settles again on the electrodes. It can be seen from this, that in the course of time very variable conditions result on the electrodes, which can uncontrollably alter the condition of the corona discharge. The corona discharge is then no longer stable between the two electrodes and a flickering of the corona discharge results. A further cause for an unstable corona discharge can also be found in the surface condition of the electrode tips. A rough electrode, not formed rotation-symmetrical, can also lead to a flickering corona discharge due to thermal air movement created during the splicing process. This leads to irregular, not reproducible fiber heating. The result of this, that the quality of the fiber connection in certain cases can vary greatly. With flickering of the corona discharge it can happen that the area of the greatest heating forms above or below the splice point, so that the originally expected heating at the ends of the fibers is not achieved, or is not achieved in a timely manner. Looking in the fiber longitudinal direction, an unstable corona discharge thus leads to a heating of a larger fiber area in comparison to heating with clean electrodes. These deviations cause an irregular fiber heating at the splice point even with unchanged splicing voltage, which results in an undefined material flow. This leads to a deterioration of the splice attenuation result. Besides the electrode contamination, flickering corona discharge can also be caused by air movement, where the previously mentioned problems can also occur. Additionally, due to burning off of the electrodes, changes in the electrical corona discharge can occur, since the distance between the electrodes increases.

With such thermal splicing devices, the electrodes and the environment of the corona discharge are completely open, so that the corona discharge is completely exposed to the environmental conditions. With these devices, the avoidance of an unstable corona discharge can only be achieved by constantly cleaning or replacing the electrodes. Another possibility for avoiding the instability would be an adjustment of the splicing voltage, so that the fiber temperature at the splice point corresponds to the ideal temperature. This is, however, very time-consuming and leads to only a conditional improvement of the splicing results since constantly changing temperature conditions at the splice point result due to the non-reproducible flickering of the corona discharge. Additionally, it is not possible to remove the effects of the asymmetrical fiber heating by such means.

The present invention has the objective to stabilize the corona discharge during thermal splicing of optical fibers in an optical fiber splicing device. This objective is achieved with an optical fiber splicing device of the initially explained type, by arranging a corona discharge guide in the area of the corona discharge surrounding the electrodes.

A decisive advantage over the state of the art technology lies in the fact that a corona discharge guide is added in the construction of the corona discharge area according to the invention, with which the electrodes and the corona discharge are largely protected against environmental influences. This corona discharge guide consists essentially of a surrounding tube or profile body, in whose inner space the corona discharge is constructed. Two small tubes are inserted between the two electrodes into the corona discharge length, so that the corona discharge is guided within the tubes to the immediate area at the ends of the optical fibers to be connected. The dimensions of the tubes have to be such that the same temperature conditions exist at the ends of the fibers with clean, non-flickering electrodes as without tubes, that is, the corona discharge has to be able to spread unimpeded in each case. As mentioned before, a flickering corona discharge results in temporary direction changes of the corona discharge, which leads to the described irregularities. Such a detour or deflection is avoided due to the measures according to the invention based on the spatial guiding of the electrical corona discharge in the area of the electrodes. This leads to the light arc position at the splice point remaining constant, even with a local detour near the electrodes. Additionally, the use of the corona discharge guide has the advantage that there is less burning off and that the increased electrode distance in the area of the splice point due to burning off in the area does not appear.

For the material of the light arc guide, a non-electricity-conducting, low thermal conducting material, which additionally has to be heat, ozone and UV resistant is necessary. Especially suitable is therefore ceramic or quartz glass material.

As corona discharge guide in the concept of the invention a continuous tube between the electrode can also be used, where corresponding openings for the insertion of the ends of the fibers and corresponding observation channels for monitoring the splicing process are provided in the area of the connection point of the optical fibers. This leads to an additional advantage, since the corona discharge is guided over a much greater area. Thus, a still better stabilization of the electrical corona discharge can be achieved.

A further construction sample for a corona discharge guide according to the invention results from the use of a continuous tube, which is divided in longitudinal direction in such a way that two complimentary longitudinal parts result. The tube should be divided into two equal parts in the longitudinal direction. It is advantageous for the lower part of the tube to be fastened tightly into the splicing device or the spark gap of the splicing device, respectively, and for the upper part to be attached in a hinged manner. It is advantageous to combine the upper part with the electrode hinge of the spark length so that only one hinge process is necessary. Corresponding openings for the insertion of the ends of the fibers and for monitoring also have to be provided here in the area of the connection point. The advantage of this construction lies in the fact that the corona discharge is also guided and protected over a larger area and that the ends of the fibers to be connected can be inserted much easier at the connection point. Additionally, the mechanical cleaning of the electrodes is much easier with the hinged tube.

An additional improvement of the corona discharge stability can be achieved when the necessary openings in the area of the connection point are closed off with an additional removable cover, where only the tiny observation channels and the insertion openings are open to the environment. It is also advisable that the cover is connected to the electrode hinge so that only one hinge process has to be performed.

BRIEF DESCRIPTION OF THE DRAWINGS

The invention will be explained in detail by means of eight figures.

FIG. 5 shows a cylindrical corona discharge guide with an opening in the connection area.

FIG. 6 shows a corona discharge guide in a rectangular hollow profile or in layered construction.

FIG. 8 shows a diagram about attenuation measurements.

DETAILED DESCRIPTION OF THE INVENTION

Figure 1:
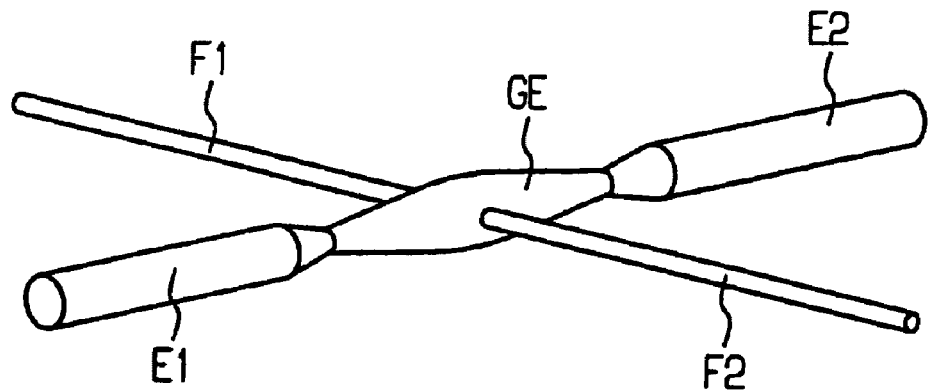
FIG. 1 shows the splicing of optical fibers under ideal conditions.

FIG. 1 gives the condition during the splicing process during the connection of two ends of optical fibers F1 and F2. The connection point under these conditions is located exactly in the center of the corona discharge GE, which forms between the two electrodes E1 and E2. Under these conditions, an equal heat distribution at the ends of the optical fibers F1 and F2 exists, so that the conditions for an uneventful connection are given.

Figure 2:
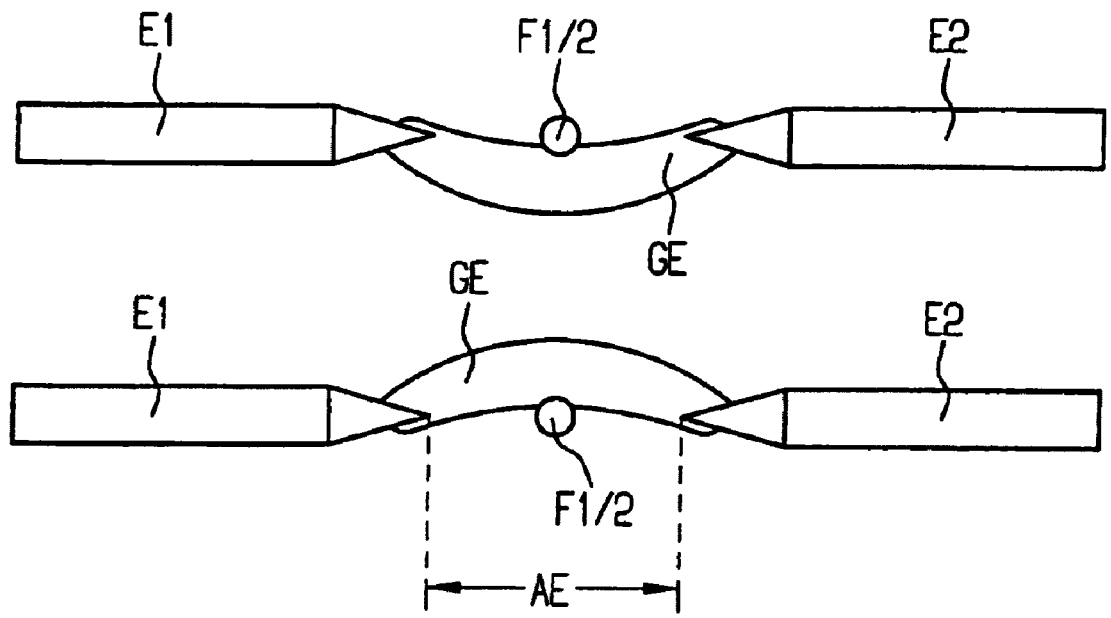
FIG. 2 shows the conditions of the flickering electrical corona discharge during the splicing of optical fibers.

FIG. 2 shows two cases of unequal heat distribution during a flickering corona discharge GE. In the upper part of this diagram, the corona discharge GE between the electrodes E1 and E2 is steered toward the bottom, so that the ends of the fibers F1/2 are heated only in the lower part by the corona discharge GE, while the upper part of the ends are not included and thus show lower temperatures. Due to these temperature variations during the splicing process in this area, variable conditions occur, which leads, among other things, to an increase in attenuation in the connection area of the fiber. Since this flickering of the corona discharge GE is not regular, no reproducible results and corrections are possible. This results in a large variation regarding the quality of the connection points. As explained previously, the flickering of the corona discharge GE can occur for example due to air movements or due to contamination or due to burning off of the electrodes, where the contamination degree due to temperature stress and wear and tear can constantly change.

Figure 3:
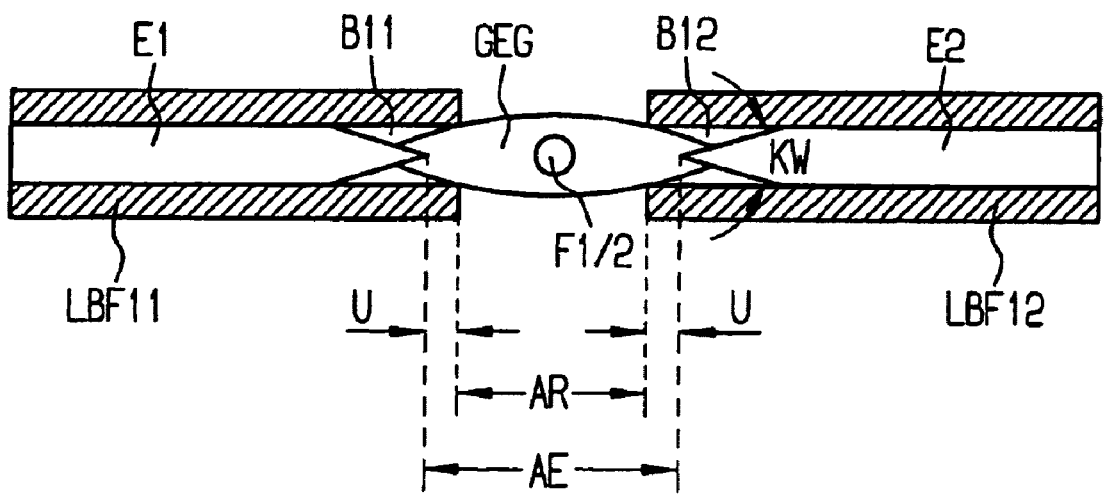
FIG. 3 shows the corona discharge guide according to the invention during the slicing of optical fibers in cross-section.

FIG. 3 illustrates the use according to the invention for a corona discharge GEG, which in this case is formed by two separate tubes LBF11 and LBF12. These tubes LBF11 and LBF12 have an inner diameter which corresponds to the outer diameter (approximately 1 to 2.5 mm) of the electrodes E1 and E2, so that the tubes can be pushed onto the electrodes E1 and E2 and be fixed there. The tubes LBF11 and LBF12 each are positioned with an overlap of approximately 0.5 mm on the electrodes E1 and E2, respectively. The electrode distance AE is preferably 2.5 mm and the distance AR between the tubes LBF11 and LBF12 is preferably 1 to 2 mm, and more preferably 1.5 mm. The wall thickness of the tubes LBF11 and LBF12, respectively, is 1 to 2.5 mm. The electrodes E1 and E2 can be provided with conical tips, where the cone angle KW preferably is 30°. Due to the stabilizing effect of the corona discharge guide, such tips are not necessary, which would not be possible without the corona discharge guides. In this way, less expensive electrodes can be used. The electrical corona discharge occurs between the two electrodes E1 and E2 where a part of the electrical corona discharge GEG is guided between the two corona discharge guides LBF11 and LBF12 in a protected manner.

Figure 4:
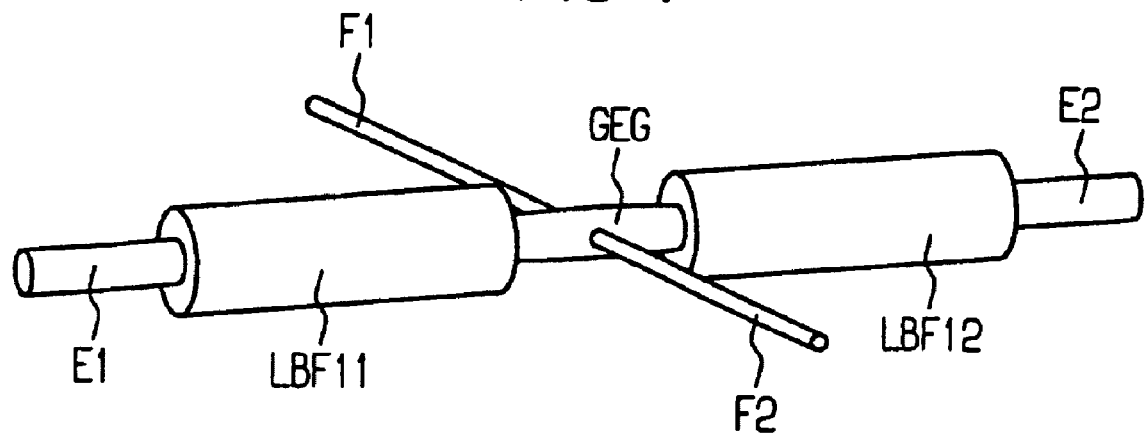
FIG. 4 shows the construction according to the invention according to FIG. 3 in perspective.

FIG. 4 illustrates the arrangement of the electrodes E1 and E2 with the added corona discharge guides LBF11 and LBF12, as well as the ends of the optical fibers F1 and F2 during the splicing process in a view in perspective. It is displayed here, that the corona discharge GEG is now guided or protected, respectively, on the basis of the corona discharge LBF11 and LBF12, that is the form of the corona discharge GEG in its ideal form is equal or approximate, respectively, to the ideal form, so that constant and optimal conditions for splicing of the two ends of the optical fibers F1 and F2 exist in the connection point.

In FIG. 5 a second construction sample for a corona discharge guide LBF2 according to the invention is shown. Here the guide LBF2 is a continuous cylindrical tube, which is provided with an axial longitudinal bore B. In the center area an opening A2 transverse to the longitudinal axis is applied, which stretches below the bore B. This opening is 1 to 2 mm, preferably 1.5 mm wide and in it the two ends of the optical fibers to be connected are inserted transverse to the longitudinal axis. The two electrodes of the spark length are inserted from both sides into the bore B and fixed with a distance corresponding to the given circumstances. The corona discharge forming between the two electrodes is thus guided through the light arc guide LBF2 in a protected manner, so that nearly ideal corona discharge conditions for the splicing are present in the opening. Since this corona discharge guide LBF2 is formed as a continuous tube, suitable monitoring or lighting channels BK, respectively, have to be inserted in the connection area, that is in the opening A2, so that the alignment of the fibers and the subsequent splicing process can be monitored over appropriate optical elements. Dashed lines indicate the relevant path of beams SB1 and SB2. Additionally, a cover AB1 is shown in this diagram, which can be, if needed, be put over the opening A2, in order to achieve further protection of the connection point during the splicing process. This cover has to have cut-outs ALB for the corona discharge and cutouts AF for the transverse inserted fibers, as well as monitoring and lighting channels BK. Here the path of beams SB1 and SB2 are also indicated.

FIG. 6 shows a construction sample according to the invention for a continuous corona discharge guide LBF3, which is based on a hollow profile with a rectangular hollow space RH. Here again there is an opening A3 at the connection point, so that the sideways insertion of the ends of the optical fibers can proceed. The electrodes are located in the rectangular hollow space RH. Lighting and monitoring channels BK3 are also provided here and the path of beams SB1 and SB2 are indicated. The opening A3 can also, if needed, be covered with a cover AB3 for better guidance of the corona discharge, where appropriate cutouts ALB and AF, as well as lighting and monitoring channels BK have to be present.

The electrodes can also be embedded or infused, respectively, into the material of the corona discharge guide.

Figure 7:
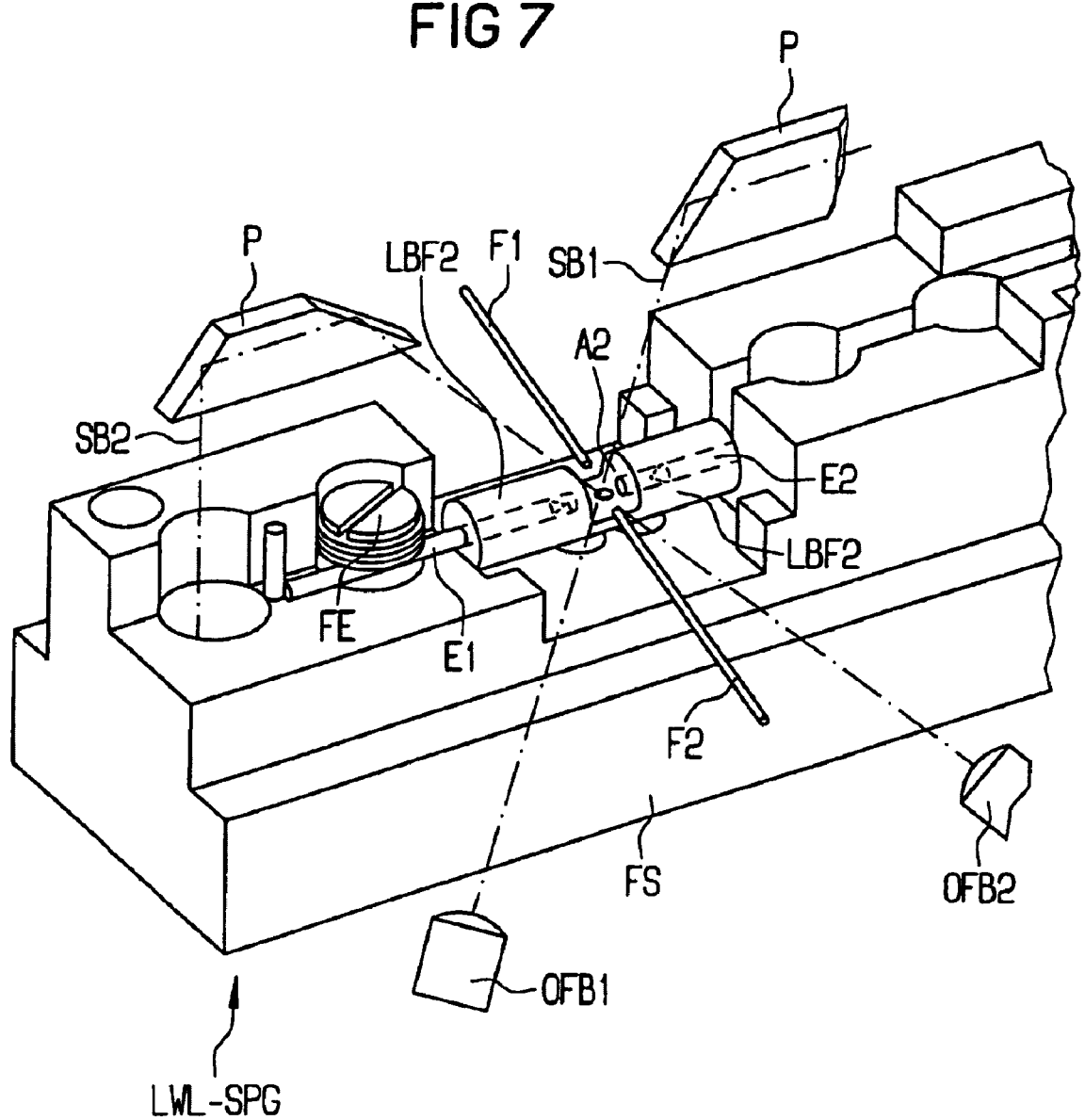
FIG. 7 shows a spark length of an optical fiber splicing device with built-in corona discharge guide.

FIG. 7 displays as a segment of a known optical fiber spicing device LWL-SPG a spark length FS, where a corona discharge guide LBF2 according to the invention is inserted in the area of the connection point. In this case, it is the corona discharge guide LBF2, which was described in detail in FIG. 5. However, the further connection in this area of the optical fiber splicing device LWL-SPG is noticeable, especially the frequently mentioned, but already known lighting and monitoring beam paths SB1 and SB2. Over appropriate senders, prisms P and appropriate optical receivers OFB1 and OFB2, and in cooperation with the lighting and monitoring channels of the corona discharge guide LBF2, a correct lighting and monitoring in the area of the connection is possible. The two ends of the fibers F1 and F2 to be connected are inserted vertically to the axis of the two electrodes E1 and E2 into the opening A2 and pushed together with appropriate thrust in the formed corona discharge for mutual fusing. Due to the protection and guidance of the corona discharge, connections of fibers are possible under nearly equal conditions, so that steady and reducible quality can be maintained.

FIG. 8 displays a diagram showing measurement results of attenuation during connection of fibers. From this it can be seen that splices, which are produced without a corona discharge guide (open bar display), show significantly higher attenuation values and that the dispersion area is very large. With splices, which are produced with a corona discharge guide according to the invention (closed bar display), significantly smaller attenuation paths resulted, which also are very close to each other. This can be unmistakably attributed to the fact, that the conditions at the electrodes and in the corona discharge area are improved by the corona discharge guide according to the invention.

The invention claimed is:

1. Optical fiber splicing device for substance-determined connection of optical fibers with a device for the approaching of the ends of two fibers, a positioning device for equal axis alignment of the ends of the optical fibers as well as electrodes for producing an electrical corona discharge for the splicing of the ends of the optical fibers, where a corona discharge guide (LBF11/12, LBF2, LBF3) surrounding the electrodes (E1, E2) is arranged in the area of the corona discharge (GE, GEG), the corona discharge guide (LBF11/12) being formed by two separate tubes (LBF11, LBF12), each positioned on an electrode (E1, E2) and attached to it with an excess overhang over the end of the electrode (E1, E2).

2. Optical fiber splicing device according to claim 1 wherein the light arc corona discharge guide (LBF11/12, LBF2, LBF3) comprises a non-electricity conducting, low thermal conducting material comprising ceramic or quartz glass.

3. Optical fiber splicing device according to claim 1 wherein the wall thickness of the tubes (LBF11, LBF12, LBF2, LBF3) are between 1 to 2.5 mm.

4. Optical fiber splicing device according to claim 1 wherein the inner diameter of the tubes (LBF11, LBF12, LBF2, LBF3) are between 1 to 2.5 mm and correspond to the outer diameter of the electrodes (E1, E2).

5. Optical fiber splicing device according to claim 1 wherein the electrodes (E1, E2) comprise tungsten.

6. Optical fiber splicing device according to claim 1 wherein the electrodes (E1, E2) comprise tips formed in a conical manner at the free ends with a cone angle (KW) of 30° and the distance (AE) of the two tips of the electrodes (E1, E2) positioned opposite each other is between 0.5 to 10 mm.

7. Optical fiber splicing device according to claim 1 wherein the distance (AR) of the tubes (LBF11, LBF12) and an opening (A2, A3) is between 1 to 2 mm.

8. Optical fiber splicing device according to claim 1 wherein the opening (A2, A3) or the distance between the two tubes (LBF11, LBF12) is provided with a removable cover (AB1, AB3).

9. Optical fiber splicing device according to claim 8, wherein the cover (AB1, AB3) comprises lighting channels (BK) and cutouts (AF) for insertion of the ends of the optical fibers (F1, F2) and cutouts (ALB) for the electric corona discharge (GEG).

10. Optical fiber splicing device for substance-determined connection of optical fibers with a device for the approaching of the ends of two fibers, a positioning device for equal axis alignment of the ends of the optical fibers as well as electrodes for producing an electrical corona discharge for the splicing of the ends of the optical fibers, where a corona discharge guide (LBF11/12, LBF2, LBF3) surrounding the electrodes (E1, E2) is arranged in the area of the corona discharge (GE, GEG), the corona discharge guide showing a tube, which is divided longitudinally in such a way that two complimentary longitudinal parts result, where the lower longitudinal part of the tube is fastened to the optical fiber splicing device and the upper longitudinal part of the tube can be positioned onto the lower longitudinal part of the tube in connection with a hinge arrangement of the optical fiber splicing device.

11. Optical fiber splicing device according to claim 10 wherein the monitoring channels (BK) are arranged in the corona discharge guide (LBF2, LBF3) in the area of the fiber connection point for optical monitoring of the splicing process.

12. Optical fiber splicing device according to claim 10 wherein the corona discharge guide (LBF3) is formed as a hollow profile with a hollow space (RH) of a rectangular cross-section.

13. Optical fiber splicing device according to claim 10 wherein the electrodes (E1, E2) are embedded or infused into the material of the corona discharge guides (LBF2, LBF3).

\* \* \* \* \*